(No Model.)
2 Sheets—Sheet 1.
C. A. WELLER.
PRESS FOR MOLDING LETTERS FROM ARTIFICIAL STONE.
No. 306,884. Patented Oct. 21, 1884.
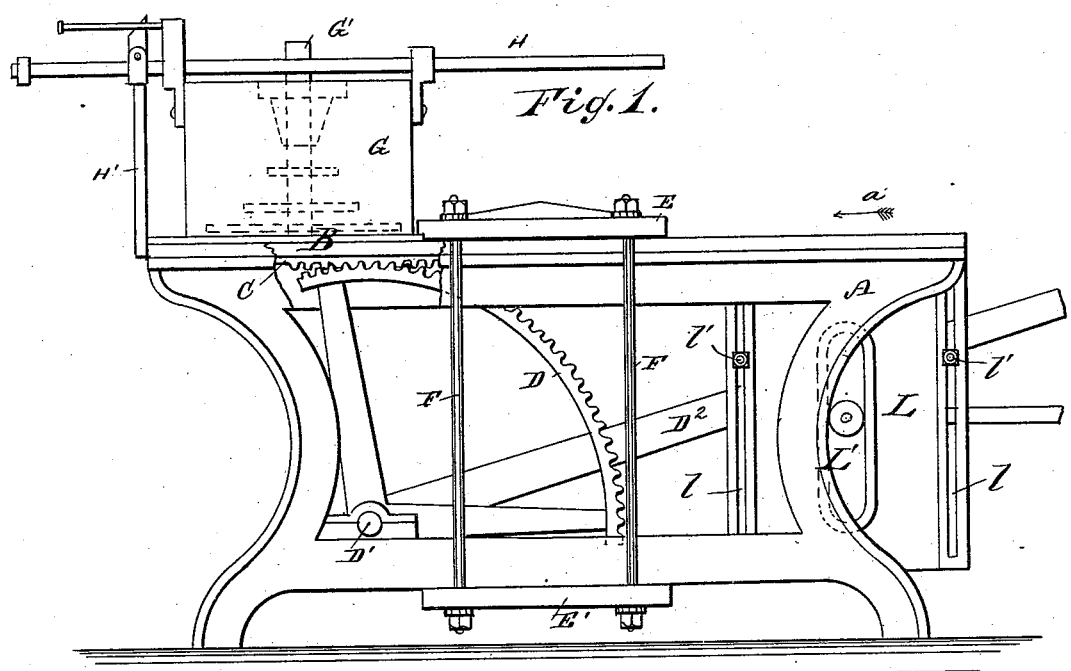
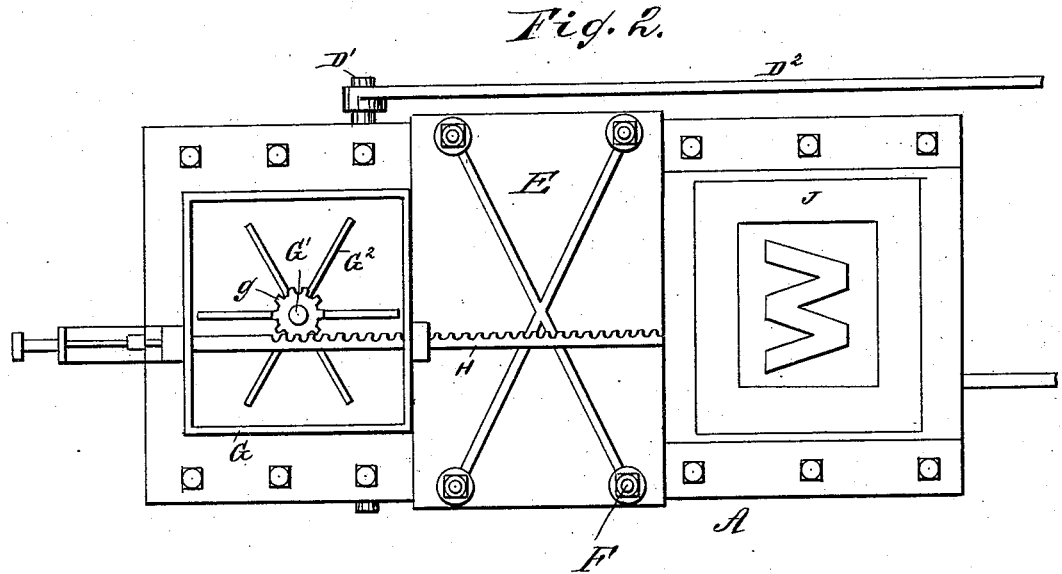
WITNESSES:
INVENTOR:
C. A. Weller
BY Munn & Co.
ATTORNEYS.

(No Model.) 2 Sheets—Sheet 2.

C. A. WELLER.
PRESS FOR MOLDING LETTERS FROM ARTIFICIAL STONE.

No. 306,884. Patented Oct. 21, 1884.

WITNESSES:
Theo. G. Hoster
C. Sedgwick

INVENTOR:
C. A. Weller
BY Munn & Co
ATTORNEYS.

United States Patent Office.

CHESTER A. WELLER, OF NEW YORK, N. Y., ASSIGNOR TO HIMSELF AND LOUIS G. LEYRER AND EMMA L. JOHNSON, BOTH OF SAME PLACE.

PRESS FOR MOLDING LETTERS FROM ARTIFICIAL STONE.

SPECIFICATION forming part of Letters Patent No. 306,884, dated October 21, 1884.

Application filed February 29, 1884. (No model.)

*To all whom it may concern:*

Be it known that I, CHESTER A. WELLER, of the city, county, and State of New York, have invented a new and Improved Press for Molding Letters from Artificial Stone, of which the following is a full, clear, and exact description.

The object of my invention is to provide a new and improved machine for molding letters, figures, or digits and ornamental pieces out of artificial-stone mass or any other plastic mass.

The invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 3:
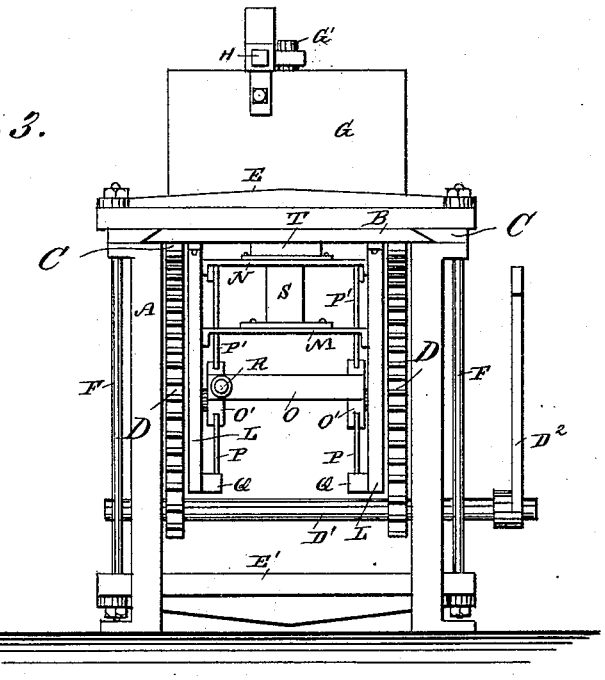
Figure 4:
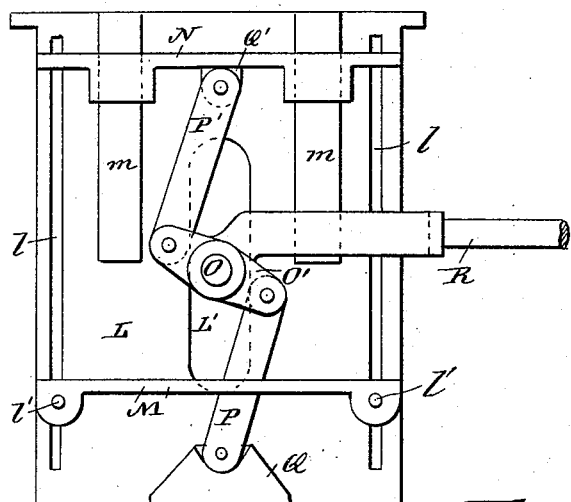
Figure 5:
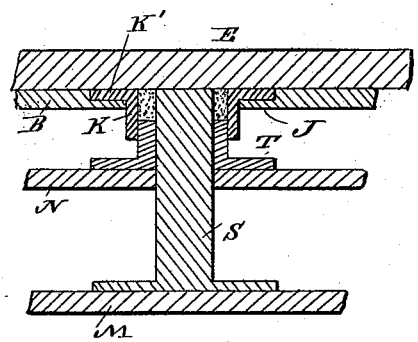
Figure 6:
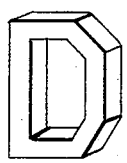

Figure 1 is a longitudinal elevation of my improved machine for molding letters, &c., parts being broken away. Fig. 2 is a plan view of the same. Fig. 3 is an end view of the same. Fig. 4 is a detail side view of the pressing mechanism. Fig. 5 is a detail sectional view of the die. Fig. 6 is a perspective view of one of the letters.

On top of a frame, A, or between the two side pieces of the said frame, a top plate, B, is held to slide, the side edges of the top plate being beveled and held under beveled strips on the top of the machine.

On the under side of the top plate, B, racks C are formed, which engage with the teeth of segmental racks D, mounted on a transverse shaft, D', pivoted in the bottom of the frame A, and provided at one end with a lever, D², for rocking it. A transverse plate, E, rests across the middle of the top of the frame A, and a like plate, E', extends across the bottom bars of the frame, which plates E and E' are united by rods F, the top plate, E, being the presser-plate for molding the letters. A hopper, G, is securely held above the frame A at one end of the same, and in the said hopper a vertical shaft, G', is journaled in a suitable cross-piece, which shaft is provided with a series of arms, G², of different lengths, and arranged in different horizontal planes, for the purpose of mixing the plastic mass, which is placed in the hopper, and for pressing the same down. A pinion, g, is mounted on the upper end of the shaft G', with which pinion a rack, H, engages, which is held to slide in upwardly-projecting lugs of the hopper G. A standard, H', connected with the sliding plate B, is connected with the rack H, so that the rack will be reciprocated with the sliding plate, and will revolve the shaft G'.

In that part of the plate opposite the one at which the standard H' is fastened a recess, J, is formed, for receiving the top flange, K', of the outer casing, K, of the mold, so that the upper surface of the said flange K' will be flush with the upper surface of the plate B.

At each side of the mold-opening in the sliding plate B a downwardly-projecting plate, L, is held by bolts on the under side of the sliding plate, which plate is provided at each edge with a vertical groove, $l$, through which bolts $l'$ pass, which also pass through lugs in a plate, M, which can be adjusted vertically between the vertical plates L, which plates L are provided in their inner surfaces with two guide ridges, $m$, which pass into guide-ridges in the edges of a vertically-sliding press-plate, N, held between the vertical plates L. Each vertical plate L is provided with a vertical slot, L', into which rollers pass which are mounted on the ends of a transverse shaft, O, which is adapted to slide vertically in the said grooves L'.

On each end of the shaft O a cross-piece, O', is formed, to the ends of each of which connecting-rods P and P' are pivoted, the former projecting downward and the latter upward. The downwardly-projecting rods P have their lower ends pivoted to lugs Q on the sides of the vertical plates L, and the upwardly-projecting rods P' are pivoted to lugs Q' on the movable press-plate N. A lever, R, projects from the shaft O, and is used for the purpose of working the said shaft. The contour of the opening in the mold K is precisely the same as the outer contour of the letter or ornament to be shaped or molded. A standard, S, secured on the adjustable plate M, has exactly the same cross-section as the opening of the letter or ornament, provided the said letter or ornament has a central opening. Letters like D O Q R, &c., have central openings and require the standard S. A die or plunger, T, which is secured on the movable press-plate N, is of such thickness and shape that it fits exactly and precisely on the space between the inner surface of the mold K and the outer surface of the standard S. If letters like M I J K W, &c., are formed, the standard S can be dispensed with and only the mold K and the die or plunger T are used.

The operation is as follows: The artificial-stone mass or other mixture from which the letters or ornaments are to be formed is filled into the hopper G. If the lever $D^2$ of the shaft D' is raised, the segmental racks D C will move the plate B in the direction of the arrow a', and the mold will be under the hopper, which is open at the bottom. The lever $D^2$ is then pressed downward until the mold is directly below the fixed press-plate E. Then the outer end of the lever R is pressed downward, whereby the movable press-plate N will be pressed upward and will compress the material contained in the mold between the upper edge of the die T and the under surface of the press-plate E. The pressure will not be on the frame of the machine. It will all be taken up by the plate E and by the plates L as the pressure of the lever R exerts itself on the plates L and presses the movable press-plate N upward, the pressure of which is exerted against the mass and against the plate E. After a letter has been molded, the lever $D^2$ is swung downward still farther to swing the mold to the front end of the machine, and then the lever R is again depressed, forcing the plunger or die T to press the molded letter upward. The letter is then dried, finished, &c. The lever R is swung up for the purpose of lowering the die T, the mold is moved under the hopper again, and so on.

Before operating with this machine the plate M must be so adjusted that the standard S will be flush with the upper surface of the sliding plate B. When the lever R is raised, the plunger or die T will be lowered to such an extent as to leave a cavity between the upper surface of the sliding plate B and the upper surface of the die T, to receive the desired quantity of the plastic mass.

Having thus described my invention, what I claim as new, and desire to secure by Letters Patent, is—

1. In a molding-machine, the combination, with a fixed hopper, of a sliding mold-plate, B, provided with the racks C on its lower surface, the segmental racks D, the shaft D', and the lever $D^2$ on the end of said shaft, substantially as herein shown and described.

2. In a molding-machine, the combination, with the hopper G, the sliding mold plate B, provided with the racks C, and the segmental racks D, of the stirrer-shaft G', provided with the pinion g, the rack-bar H, and the rod H', connected to said mold-plate and rack-bar, substantially as herein shown and described.

3. In a molding-machine, the combination, with the sliding mold-plate B and the stationary plate E, of the sliding die-plate N, the shaft O, the arms O', the rods P P', and the lever R, substantially as herein shown and described.

4. In a molding-machine, the combination, with the hopper G, the sliding plate B, provided with mold K, and means for operating the said plate, of the sliding plate N, provided with die T, the shaft O, arms O', rods P P', and lever R, substantially as herein shown and described.

5. In a molding-machine, the combination, with the sliding mold-plate B and the plates L, of the plate M, adjustably secured to said plates, and the standard S on said adjustable plate, substantially as herein shown and described.

6. In a molding-machine, the combination, with a sliding plate carrying the mold K, of the plates L, projecting downward from the sliding plate, and provided with vertical slots l, the horizontal plate M, held on the plates L by bolts l', passed through the slots l, the standard S on the plate M, the vertically-sliding press-plate N, carrying the plunger or die T, the fixed press-plate E, and of the levers for pressing the press-plate N upward, substantially as herein shown and described.

7. A mold for molding letters or ornaments, consisting of an outer section the aperture of which has the same contour as the outer edge of the letter or figure to be formed, a standard the cross-section of which is the same as the opening in the letter or figure to be formed, and of a plunger adapted to slide between the inner surface of the outer mold and the outer surface of the standard, substantially as herein shown and described.

CHESTER A. WELLER.

Witnesses:
OSCAR F. GUNZ,
C. SEDGWICK.